United States Patent
Mochizuki et al.

(10) Patent No.: US 8,452,455 B2
(45) Date of Patent: May 28, 2013

(54) CONTROL DEVICE AND CONTROL METHOD OF PLASMA PROCESSING SYSTEM, AND STORAGE MEDIUM STORING CONTROL PROGRAM

(75) Inventors: Hiroaki Mochizuki, Nirasaki (JP); Masahiro Numakura, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 831 days.

(21) Appl. No.: 12/496,117

(22) Filed: Jul. 1, 2009

(65) Prior Publication Data

US 2010/0004785 A1   Jan. 7, 2010

(30) Foreign Application Priority Data

Jul. 3, 2008   (JP) .................. 2008-174711

(51) Int. Cl.
*G05B 24/04*   (2006.01)

(52) U.S. Cl.
USPC ........... 700/266; 700/275; 205/641; 205/725; 205/743; 438/5; 438/48; 438/800; 438/905; 438/926

(58) Field of Classification Search
USPC ................. 700/266, 275; 205/84, 641–643, 205/725, 743; 438/5, 48, 800, 905, 926
See application file for complete search history.

(56) References Cited

FOREIGN PATENT DOCUMENTS

JP   2008-19017   1/2008

*Primary Examiner* — Brian R Gordon
*Assistant Examiner* — Shogo Sasaki
(74) *Attorney, Agent, or Firm* — Rothwell, Figg, Ernst & Manbeck, P.C.

(57) ABSTRACT

In a control device of a plasma processing system, a communication unit is configured to receive processing information related to a carrier of a next processing lot. A determination unit is configured to determine whether the processing information received by the communication unit has pre-treatment information related to one of the plasma processing devices. When it is determined that the processing information has the pre-treatment information by the determination unit, a generation unit is configured to generate an object for declaring execution of the pre-treatment for the carrier of a next processing lot if a desired condition of transferring of the carrier is satisfied. In addition, if the object is generated by the generation unit, a process executing control unit is configured to start the pre-treatment for the target object in the carrier of a next processing lot without any notification that the carrier reaches a destination plasma processing device.

20 Claims, 10 Drawing Sheets

CONTROL DEVICE AND CONTROL METHOD OF PLASMA PROCESSING SYSTEM, AND STORAGE MEDIUM STORING CONTROL PROGRAM

CROSS-REFERENCE TO RELATED APPLICATIONS

This application claims priority to Japanese Patent Application No. 2008-174711, filed on Mar. 3, 2008, the entire contents of which are hereby incorporated by reference.

FIELD OF THE INVENTION

The present invention relates to a control device and a control method of a plasma processing system, which performs a predetermined treatment on a target object, and a storage medium storing control program, more particularly to the timing for pre-treatment such as cleaning, seasoning or the like.

BACKGROUND OF THE INVENTION

Recently, the manufacturing process has been automatically performed by automated material handling systems (AMHS) such as overhead hoist transports (OHT) or automatic guided vehicles (AGV) in semiconductor manufacturing factories (see, e.g., Japanese Patent Laid-open publication No. 2008-19017).

In an automated material handling system shown in FIG. 1, for example, a plurality of plasma processing devices PM are installed in bay areas B1 to B4 of a manufacturing factory. A plurality of wafers is accommodated per lot in a multi-stepped form in maintenance shelves S1 to S4 (or collectively referred to as S). Rails PP and P1 to P4 are placed between the respective plasma processing devices PM and the maintenance shelves S to enable a plurality of transfer carriages Ve to move on the rails. Carriers taken from maintenance shelves S are loaded on the transfer carriages and are transferred to loading ports of the plasma processing devices PM that execute desired processes. For example, in order to perform a lithography process and then an etching process on wafers, the carrier is firstly transferred to a lithography device to lithograph all wafers in the carrier and the carrier is then transferred to a plasma etching device to etch all the wafers in the carrier.

The processes such as etching and the like are executed per wafer or per lot in the order of a customized recipe. When performing a plasma processing on a product wafer, a pre-treatment (or dummy treatment) such as cleaning, seasoning, or the like may be firstly performed to adjust the conditions of the processing space for the product wafers of next lot. The pre-treatment is also performed in the order of the recipe.

In the pre-treatment such as cleaning, seasoning, or the like, a dummy wafer in the loading port LP or the dummy storage (or dummy maintenance shelf) is typically used instead of the product wafer. Accordingly, it is not necessary that a carrier having the product wafer be inserted into the loading port LP.

Each process including the pre-treatment, however, is executed after it is checked that the carrier is inserted into the loading port LP. Specifically, after the carrier is inserted into the loading port LP, the recipe is first searched and it is checked whether the recipe has the pre-treatment before starting the pre-treatment. After the pre-treatment has completed, the plasma processing of the product wafer is performed. In such a control method, even though the pre-treatment does not need the product wafer, it is impossible to start the pre-treatment before the carrier is inserted into the loading port LP, thereby lowering the throughput. In fact, since the carrier is not guaranteed to be continuously inserted into the loading port LP, the above control becomes hindrance in increasing the productivity.

SUMMARY OF THE INVENTION

In view of the above, the present invention provides a control device and a control method of a plasma processing system, which efficiently performs a pre-treatment, and a storage medium storing control program.

In accordance with an aspect of the present invention, there is provided a control device of a plasma processing system, which transfers a plurality of carriers to a plurality of plasma processing devices and performs plasma processing of a target object (e.g. a wafer) inserted in each carrier in the plasma processing devices, including: a communication unit, configured to receive processing information related to a carrier of a next processing lot; a determination unit, configured to determine whether the processing information received by the communication unit has pre-treatment information related to any one of the plasma processing devices; a generation unit, configured to generate an object for declaring execution of the pre-treatment for the carrier of a next processing lot if a desired condition of transferring of the carrier is satisfied when it is determined that the processing information has the pre-treatment information by the determination unit; and a process executing control unit, configured to start the pre-treatment for the wafer in the carrier of a next processing lot without any notification that the carrier reaches a destination plasma processing device if the object is generated by the generation unit.

In this case, when the processing information has pre-treatment information related to any one of the plasma processing devices, if the desired condition of transferring of the carrier is satisfied, the object for declaring execution of the pre-treatment is generated. If the object is generated, the pre-treatment for the wafer in the carrier of a next processing lot is started without any notification that the carrier reaches a corresponding plasma processing device. Accordingly, a carrier having a product wafer is not required to be actually inserted in the loading port in order to start the pre-treatment. That is, the object can be generated to start the pre-treatment before the carrier reaches the loading port of a corresponding plasma processing device. Thus, the throughput can be improved, thereby increasing the productivity.

The communication unit can receive information related to processing of the wafer in the carrier of a next processing lot and information related to transferring of the carrier as the processing information related to the carrier. The determination unit can determine whether the information related to processing of the wafer in the carrier has pre-treatment information related to any one of the plasma processing device. In addition, the generation unit can generate the object for the carrier according to the information related to transferring of the carrier if it is determined that the information related to processing has the pre-treatment information by the determination unit.

The information related to processing of the wafer in the carrier can be a data group of a process job PJ or control job CJ having recipe or process's attribute. The information related to transferring of the carrier can include commands of an instruction to "transfer the FOUP to a certain plasma processing device" (NOTIFICATION), an instruction to "transfer the FOUP to a certain loading port LP of a certain plasma processing device" (BIND), a notification that "ID of the FOUP is read" (CID READ) and a notification that "the FOUP is carried out from a maintenance shelf S" (OUT).

In this case, if the carrier having the product wafer is carried out from a maintenance shelf, then the object of a next processing lot can be generated as a trigger to start the pre-treatment for the product wafer, regardless of whether the carrier reaches the loading port of the plasma processing device, thereby improving the throughput.

If the processing information has at least one of cleaning and seasoning, the determination unit can determine that the pre-treatment information is included in the processing information.

In this case, the pre-treatment refers to cleaning, seasoning, or a combination thereof. Here, the cleaning refers to the treatment of cleanly stabilizing a processing space (or chamber) by removing the sediment, caused by the plasma processing, in the processing space with, e.g., O2 plasma. The seasoning refers to the treatment of stabilizing the temperature of the processing space or the state of the sediment by performing a certain plasma processing.

The process executing control unit can re-perform the pre-treatment if the carrier of a next processing lot reaches the loading port of the corresponding plasma processing device a preset period of time after the pre-treatment is started.

If a preset period of time has passed since the pre-treatment was started, it is difficult to maintain the condition inside the processing space adequately to process a product wafer. It is necessary to re-perform the pre-treatment to meet the condition inside the processing space adequately in order to process a product wafer before performing the plasma processing of the product wafer. Accordingly, it is possible to prevent the production yield from being decreased by using even earlier timing for the execution of the pre-treatment for a next lot.

The process executing control unit can stop processing the wafer in a different one of the carriers if the different carrier reaches the loading port of the plasma processing device at which the carrier of a next processing lot is supposed to arrive after the pre-treatment is started.

In this case, the condition inside the processing space is not adequate for the product wafer in the reached carrier. Accordingly, it is determined that it is impossible to perform the plasma processing of the product wafer, and the processing is stopped.

In accordance with another aspect of the present invention, there is provided a control method of a plasma processing system, which transfers a plurality of carriers to a plurality of plasma processing devices and performs plasma processing of a target object (e.g. a wafer) inserted in each carrier in the destination's plasma processing devices, including: receiving processing information related to a carrier of a next processing lot; determining whether the received processing information has pre-treatment information related to any one of the plasma processing devices; generating an object for declaring execution of the pre-treatment for the carrier of a next processing lot if a desired condition of transferring of the carrier is satisfied when it is determined that the processing information has the pre-treatment information; and starting the pre-treatment for the wafer in the carrier of a next processing lot without any notification that the carrier reaches a destination plasma processing device if the object is generated by the generation unit.

In accordance with yet another aspect of the present invention, a storage medium storing a control program of a plasma processing system, which transfers a plurality of carriers to a plurality of plasma processing devices and performs plasma processing of a target object (e.g. a wafer) inserted in each carrier in the plasma processing devices, executable in a computer, includes: processes of receiving processing information related to a carrier of a next processing lot; determining whether the received processing information has pre-treatment information related to any one of the plasma processing devices; generating an object for declaring execution of the pre-treatment for the carrier of a next processing lot if a desired condition of transferring of the carrier is satisfied when it is determined that the processing information has the pre-treatment information; and starting the pre-treatment for the wafer in the carrier of a next processing lot without any notification that the carrier reaches a destination plasma processing device if the object is generated by the generation unit.

In this case, if the object is generated, it is possible to start the pre-treatment for the product wafer in the carrier of a next processing lot without any notification that the carrier reaches the destination plasma processing device.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENT

Figure 1:
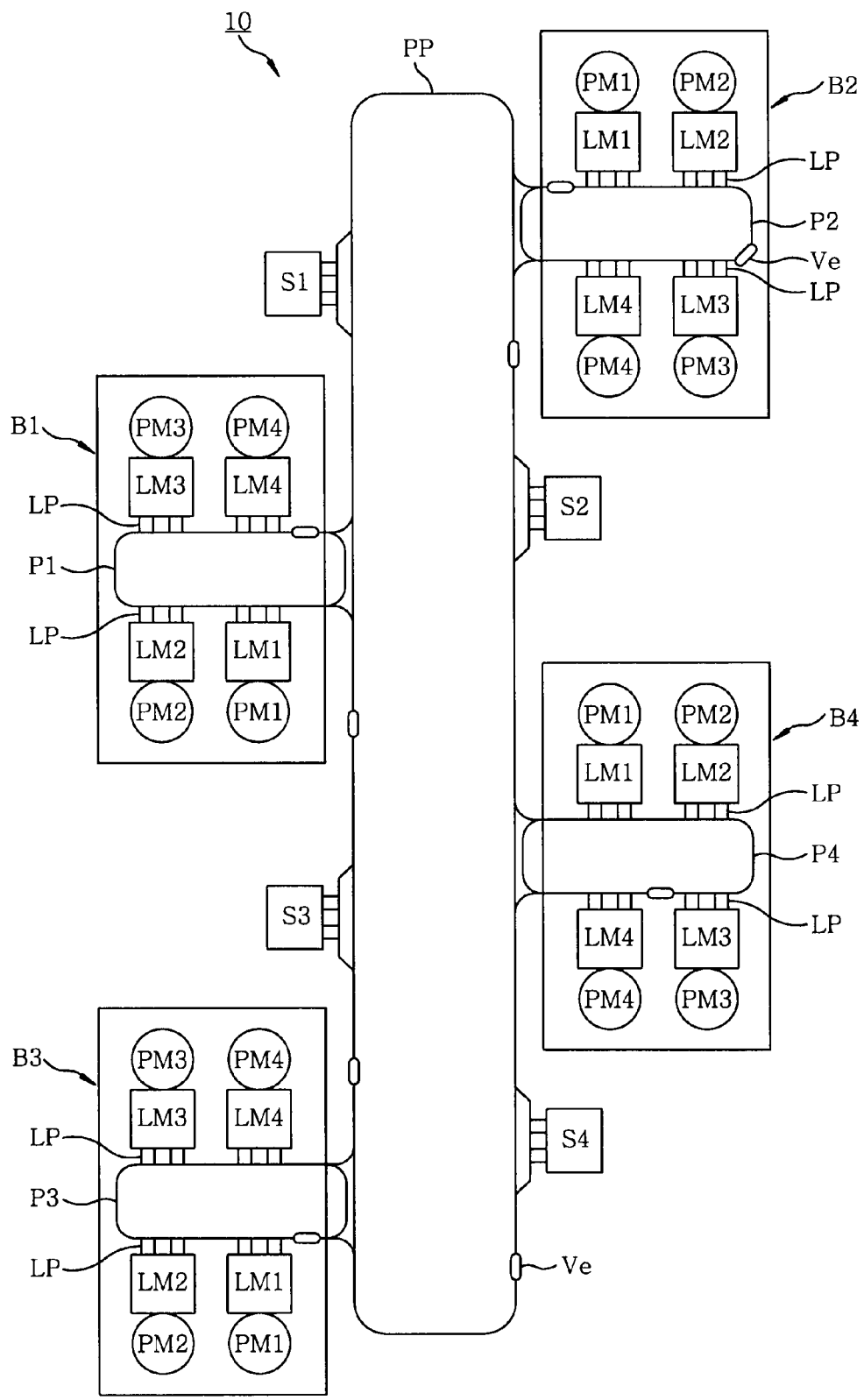
FIG. 1 is a conceptual view showing an automatic transfer system in accordance with an embodiment of the present invention.

An embodiment of the present invention will be described with reference to the accompanying drawings. Further, in the following description and drawings, components having substantially the same configuration and function are denoted by like reference characters, and thus redundant description thereof will be omitted herein.

(Automatic Transfer System)

An automatic transfer system 10 in accordance with an embodiment of the present invention will be firstly described with reference to FIG. 1. FIG. 1 is a plan view showing the automatic transfer system 10 in accordance with the embodiment of the present invention. The automatic transfer system 10, which is installed in a clean room in a semiconductor manufacturing factory, includes four bay areas B1 to B4 (or collectively referred to as B), four maintenance shelves S1 to S4, a main rail PP, and a plurality of transfer carriages Ve. The Bay areas B1 to B4 are connected to the maintenance shelves S1 to S4 through the annular main rail PP and sub rails P1 to P4. The sub rails P1 to P4 are placed at the bay areas B1 to B4, respectively. Process modules PM1 to PM4, load modules LM1 to LM4, and loading ports LP are arranged in each bay area B. The loading ports LP of the bay area B1 to B4 are connected to the sub rail P1 to P4, respectively.

The process modules PM1 to PM4 refer to a plasma processing devices that performs the plasma processing, e.g., plasma etching, plasma chemical vapor deposition (CVD), or the like, on product wafers. The maintenance shelves S1 to S4 have front opening unified pods (FOUPs). A plurality of product wafers is accommodated in the FOUPs in a multi-stepped form. A carrier refers to a transfer vessel in which wafers are accommodated. Especially, a sealed transfer vessel is referred to as FOUP.

Hereinafter, the FOUP is used as an example of the carrier.

A dummy storage (not shown) or the loading port LP stores a dummy wafer for a pre-treatment. The maintenance shelves S1 to S4 are arranged close to the bay areas B1 to B4, respectively. The transfer carriage Ve, which moves on the main rail PP and the sub rails P1 to P4, transfers a FOUP of a next processing lot to a loading port LP of a predetermined bay area B.

(Bay Area)

Figure 2:
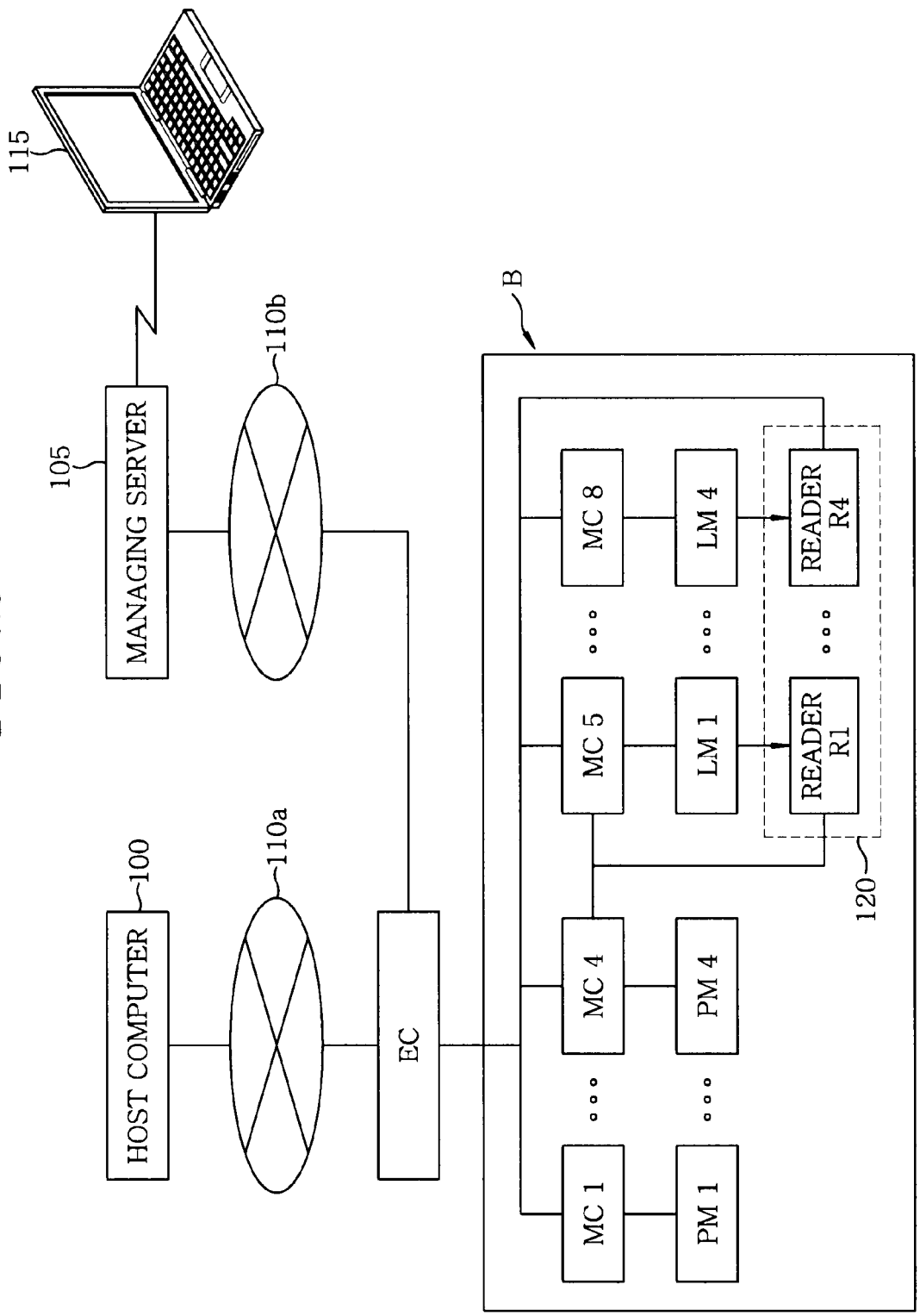
FIG. 2 is a configuration view of components arranged in a bay area B in accordance with the embodiment of the present invention.

The internal structure of one bay area B will be described with reference to FIG. 2. The bay area B includes four process modules PM1 to PM4 (or correctively referred to as PM), four load lock modules LM1 to LM4 (or correctively referred to as LM), a reader unit 120 having readers R1 to R4, and eight machine controllers MC1 and MC8 (or correctively referred to as MC). Each of the machine controllers MC1 to MC8 is connected to an equipment controller EC.

The equipment controller EC is connected to a host computer 100 and a managing server 105, respectively, via client's local area networks 110a and 110b. The managing server 105 is connected to a personal computer (PC) 115. An operator can manipulate the PC 115 to send commands to the equipment controller EC. The equipment controller EC generally controls the machine controllers MC, and the machine controllers MC1 to MC8 control the process modules PM and the load lock modules LM, respectively, under the control of the equipment controller EC. The equipment controller EC also, e.g., manages data history after operation. The host computer 100 manages the entire system such as data management and the like.

The load lock modules LM1 to LM4 maintain the pressure of their inside in a depressurized state and transfers wafers from the atmospheric side to the vacuum side or vice versa. The process modules PM1 to PM4 maintain their inside in a vacuum state and perform a predetermined plasma processing, e.g., the etching or the like, on the wafer transferred from the load lock modules LM1 to LM4. The managing server 105 sets operational conditions and the like of each component according to data transmitted from the PC 115 by the operator's manipulation.

(Internal Structure of Plasma Processing System)

Figure 3:
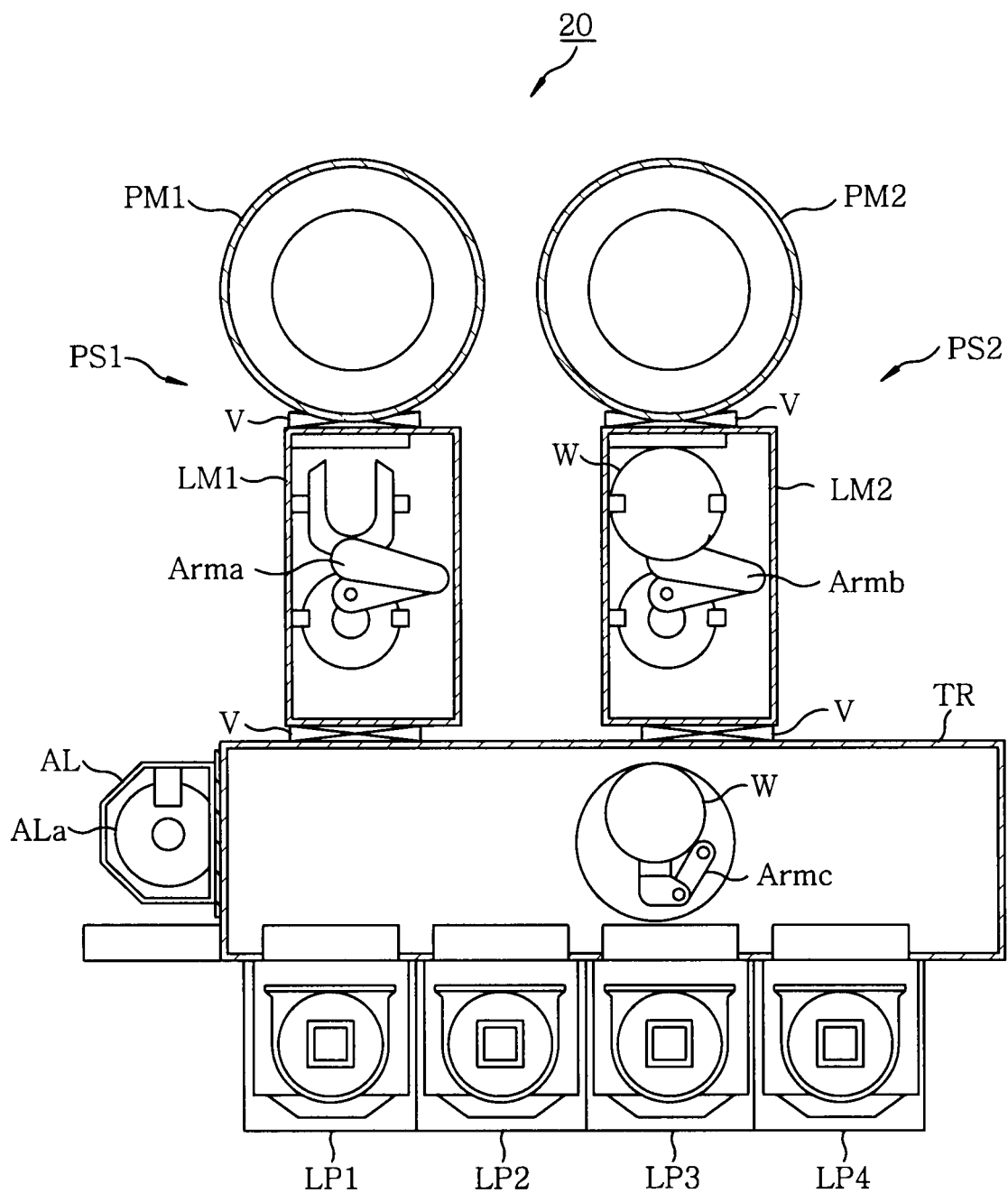
FIG. 3 shows an internal structure of a plasma processing system in accordance with the embodiment of the present invention.

The internal structure of a plasma processing system 20 will be described with reference to FIG. 3. FIG. 3 shows a half of components that are symmetrically arranged in the bay area B. The plasma processing system includes a first process ship PS1, a second process ship PS2, a transfer unit TR, and a position alignment mechanism AL, and loading ports LP1 to LP4 (collectively referred to as LP).

The process ship PS1 includes a process module PM1 and a load lock module LM1. The process ship PS2 includes a process module PM2 and a load lock module LM2. The load lock modules LM1 and LM2 control the pressure of their inside by opening or closing gate valves V provided at their opposite end portions, respectively, and transfer wafers W held by transfer arms Arma and Armb, respectively, between the process modules PM and the transfer unit TR.

The loading ports LP1 to LP4 are placed on a side portion of the transfer unit TR. FOUPs are mounted on the loading ports LP1 and LP4. The number of the loading ports LP is not limited to 4, and any number of the loading parts LP may be provided.

A transfer arm Armc, which is placed in the transfer unit TR, cooperates with the transfer arm Arma of the load lock module LM1 and the transfer arm Armb of the load lock module LM2 to transfer desired wafers W accommodated in the Loading ports LP1 to LP4.

The position alignment mechanism AL is placed at an end portion to perform the position alignment of a wafer W. The position alignment of the wafer W is performed by rotating a turntable ALa in the state where the wafer W is mounted thereon and allowing an optical sensor ALb to detect the state of a peripheral portion of the wafer W.

With such configures, the wafers W of the FOUPs mounted on each of the loading port LP pass through the transfer unit TR and undergo the position alignment in the position alignment mechanism AL before being alternately transferred to the process ships PS1 and PS2 one by one. Thereafter, the transferred wafers W undergo the plasma processing in the process modules PM1 and PM2, and then are accommodated into the FOUPs.

(Hardware Structure of Equipment Controller)

The hardware structure of the equipment controller EC will be described with reference with FIG. 4. The equipment controller EC is an example of the control device of a plasma processing system 20. The hardware structure of the machine controller MC is identical to that of the equipment controller EC, and therefore the description thereof will be omitted.

Figure 4:
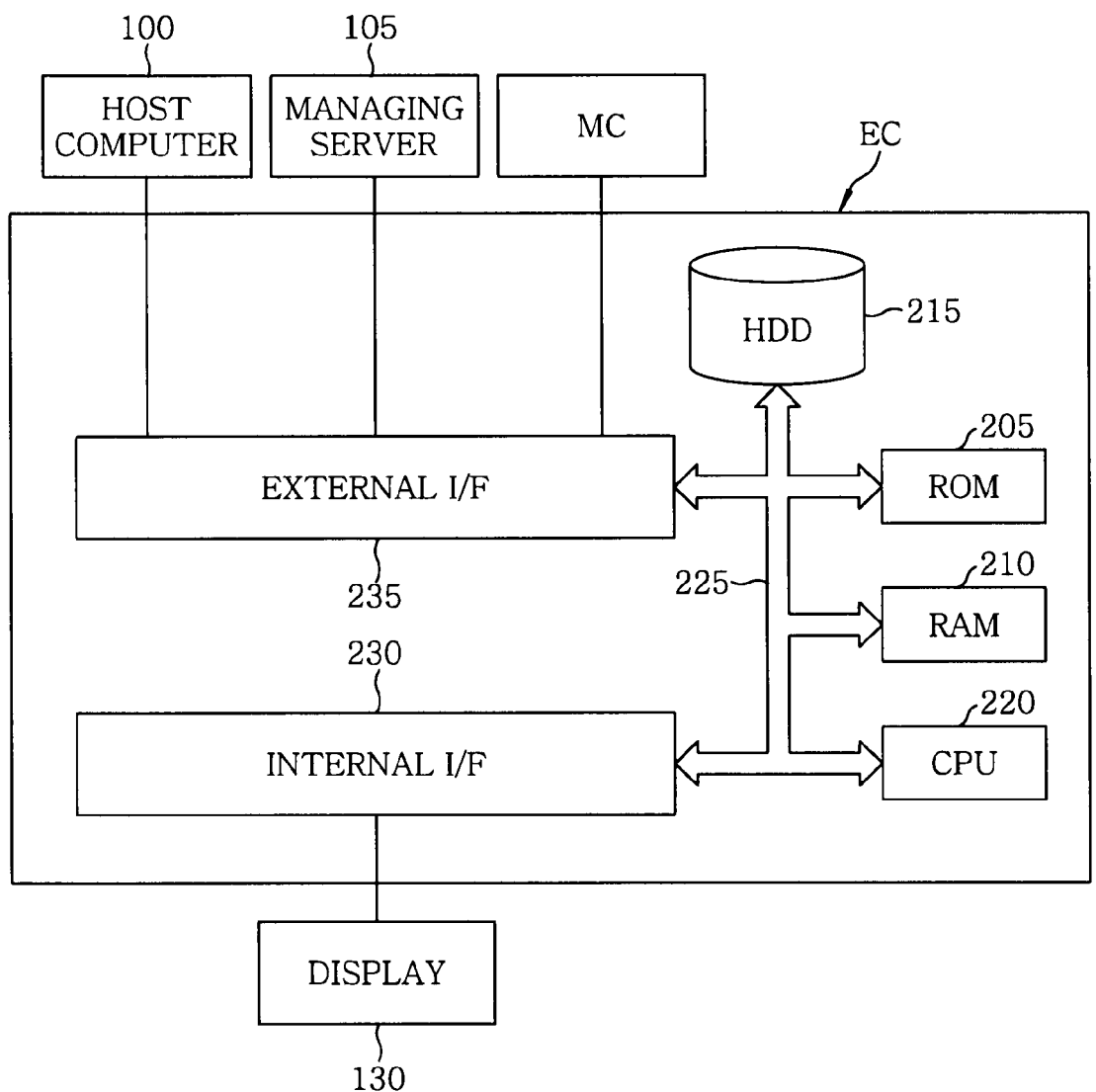
FIG. 4 shows a hardware structure of an equipment controller EC in accordance with the embodiment of the present invention.

As shown in FIG. 4, the equipment controller EC includes a ROM 205, a RAM 210, a HDD 215, a CPU 220, a bus 225, an internal interface 230, and an external interface 235.

The ROM 205 and the RAM 210 store a control program, which is executable in a computer to control the plasma processing device, a program, which is executed when an error is made, various types of recipes, and various types of data. The ROM 205 and the RAM 210 are examples of a memory device. Instead, an electrically erasable programmable ROM (EEPROM), an optical disk or a magneto-optical disk can be used.

The HDD 215 stores log information related to the plasma processing system 20. The CPU 220 controls the transferring, pre-treatment, and plasma processing of wafers according to various types of recipes. The bus 225 is used as a path for receiving and transmitting data between the ROM 205, the RAM 210, the HDD 215, the CPU 220, the internal interface 230 and the external interface 235.

The internal interface 230 inputs pertinent data to allow desired information to be displayed on a display 130. The external interface 235 transmits and receives data between the host computer 100, the managing server 105, and the machine controller MC.

(Functional Structure of Equipment Controller)

The functional structure of the equipment controller EC will be described with reference to FIG. 5, which shows each function in blocks. The equipment controller EC has the functions represented as each block of a communication unit 250, a determination unit 255, a generation unit 260, a storage unit 265, and a process executing control unit 270.

The communication unit 250 receives processing information related to a FOUP of a next processing lot. In particular, the processing information has information related to the processing of wafers in the FOUP and information related to the transferring of the FOUP.

Figure 6:
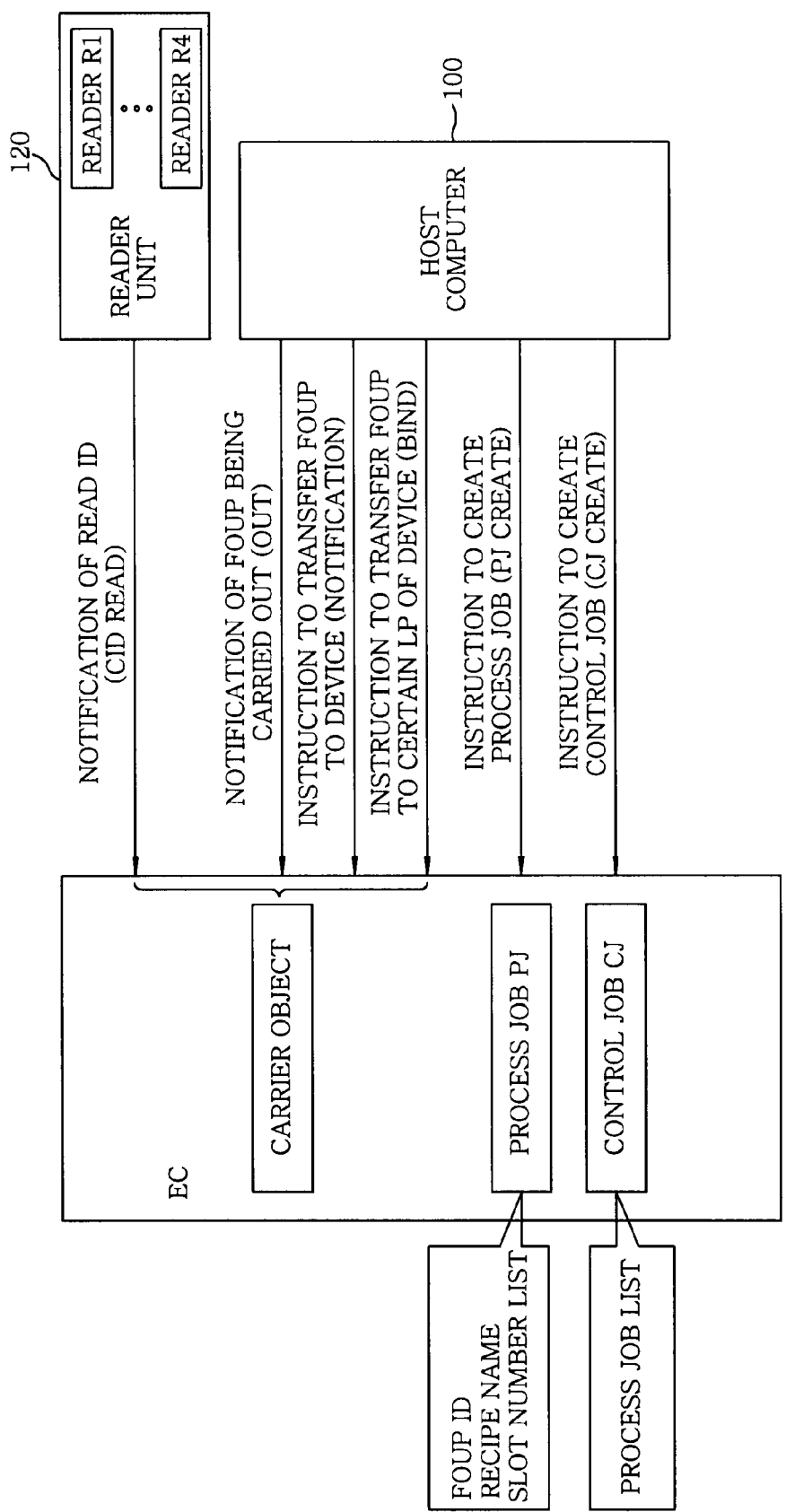
FIG. 6 shows how data flows between components in accordance with the embodiment of the present invention.

A process job PJ or control job CJ having recipes or process attributes is used as the information related to the processing of wafers in the FOUP. As shown in FIG. 6, the host computer 100 sends an instruction to "create a process job" (PJ CREATE) related a next processing lot to the equipment controller EC in order to instruct the processing of the next processing lot. The equipment controller EC creates the process job PJ according to the instruction. The process job PJ has ID of the FOUP of the next processing lot, name of the recipe including the order of the process, and a list of a slot number of the next processing lot in the FOUP.

The host computer 100 also sends an instruction to "create a control job" (CJ CREATE) related a next processing lot to the equipment controller EC. The equipment controller EC creates the control job CJ according to the instruction. The control job CJ has a list of the process job PJ, and the executing attribute of the process job PJ is fixed.

Alternatively, the equipment controller EC can be instructed to create the process job or the control job according to operator's manipulation on the screen of the PC 115 instead of the host computer 100.

The information related to the transferring of the FOUP has the commands of an instruction to "transfer the FOUP to a certain plasma processing device" (NOTIFICATION), an instruction to "transfer the FOUP to a certain loading port LP of a certain plasma processing device" (BIND), a notification that "ID of the FOUP is read" (CID READ) and a notification that "the FOUP is carried out from a maintenance shelf S" (OUT). The commands of NOTIFICATION, BIND, and OUT are transmitted to the equipment controller EC by the host computer 100 (or the operator's screen manipulation). The command of CID READ is transmitted from the reader unit 120 to the equipment controller EC. The command of CID READ is generated when a pertinent reader reads the tag attached on the FOUP that has reached a pertinent loading port LP.

The determination unit 255 checks whether the processing information related to the FOUP has information related to the pre-treatment for any one of the plasma processing devices. In particular, the determination unit 255 firstly searches the contents of the recipe having the processing order of wafers of a next processing lot by using a pertinent recipe name included in the processing information of the created process job PJ and control job CJ. Then, if the recipe has at least one of the pre-treatments such as cleaning, seasoning, and the like, the determination unit 255 determines that the processing information has the information related to the pre-treatment.

When the determination unit 255 determines that the processing information has the information related to the pre-treatment, if a desired condition for the transferring of the FOUP of a next processing lot is satisfied, the generation unit 260 generates a carrier object for declaring the execution of the pre-treatment for the FOUP of a next processing lot. The carrier object refers to a command for noticing that the FOUP reaches a desired process module PM. Particularly, if the generation unit 260 receives at least one of the commands of the instruction to "transfer the FOUP to a plasma processing device" (NOTIFICATION), the instruction to "transfer the FOUP to a certain loading port LP of a plasma processing device" (BIND), the notification that "ID of the FOUP is read" (CID READ) and the notification that "the FOUP is carried out" (OUT) from the host computer 100, the generation unit 260 determines that the condition for the transferring of the FOUP is satisfied and generates the carrier object.

Figure 5:
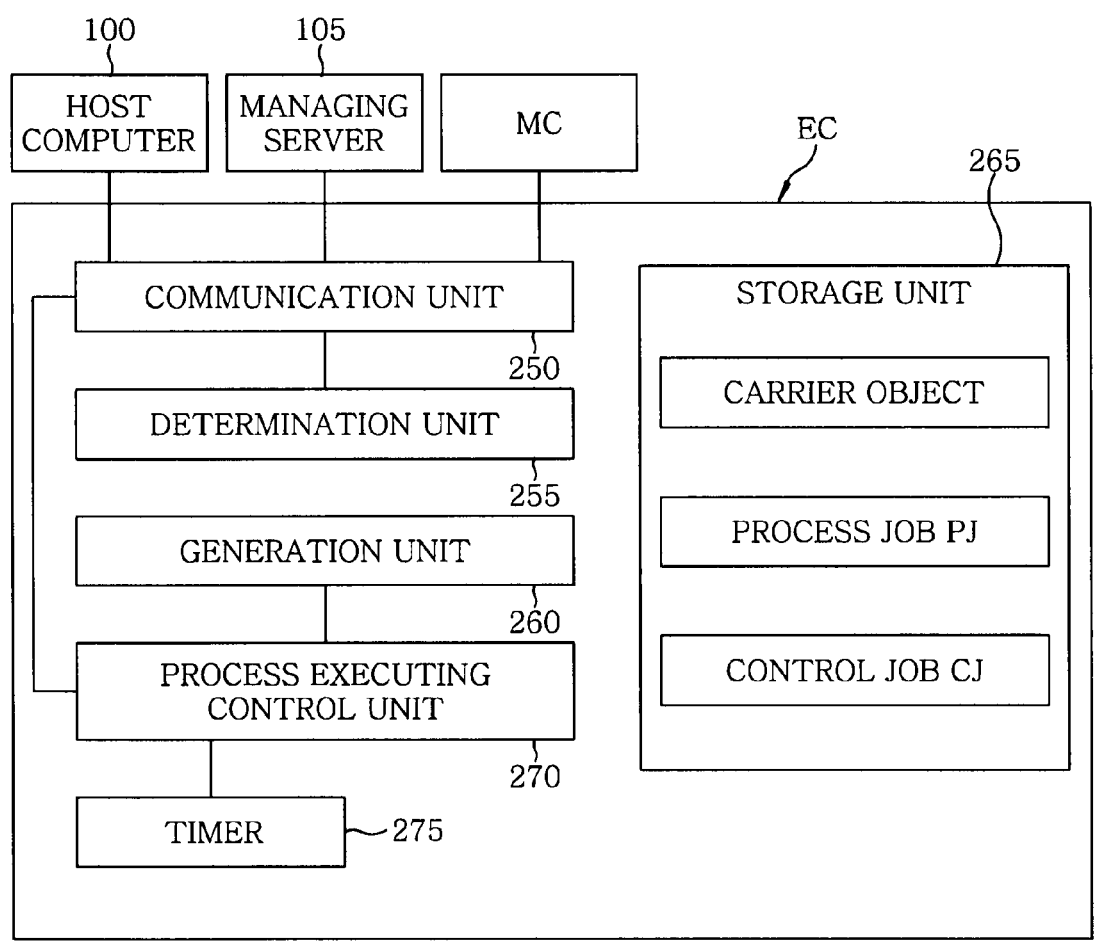
FIG. 5 shows a functional structure of an equipment controller EC in accordance with the embodiment of the present invention.

The process job PJ, the control job CJ, and the carrier object generated in the equipment controller EC, as shown in FIG. 5, are stored in the storage unit 265 having the aforementioned ROM 205 and RAM 210.

If the carrier object is generated, the process executing control unit 270 starts the pre-treatment for the FOUP of a next processing lot for a certain process module PM. Accordingly, it is possible to start the pre-treatment for the FOUP of a next processing lot without waiting for any notification that the FOUP reaches a destination's process module PM.

The process executing control unit 270 also actuate a timer 275 simultaneously when starting the pre-treatment.

If the FOUP of a next processing lot reaches a loading port LP a preset period of time after the pre-treatment is started, it becomes difficult to maintain the condition inside a processing space adequately for the processing of product wafers. For example, the temperature of the inside of the processing space may be decreased. Accordingly, the condition of the inside is allowed to become adequate for the processing of the product wafers by re-executing the pre-treatment before performing the plasma processing of the product wafers. Thus, the productivity can be prevented from being decreased in spite of the earlier execution of the pre-treatment for a next processing lot.

When the host computer 100 instructs a FOUP of a next processing lot to be transferred to a loading port LP of the plasma processing device, if a different FOUP reaches the loading port LP, the condition of the processing space is not adequate for the product wafers of the different FOUP. Accordingly, the process executing control unit 270 determines that it is impossible to sufficiently perform the plasma processing of the product wafers of the different FOUP and stops performing the processing of the different FOUP.

In fact, the above functions of the respective components of the equipment controller EC are accomplished by reading, analyzing, and executing control programs writing the processing orders of the components' functions which will be executed by the CPU 220 shown in FIG. 4, stored in the ROM 205, the RAM 210, or the HDD 215. For example, in this embodiment, the respective functions of the determination unit 255, the generation unit 260, and the process executing control unit 270 are accomplished by executing control programs that write the processing orders of the components' functions which will be executed by the CPU 220.

(Operation of Equipment Controller)

Figure 7:
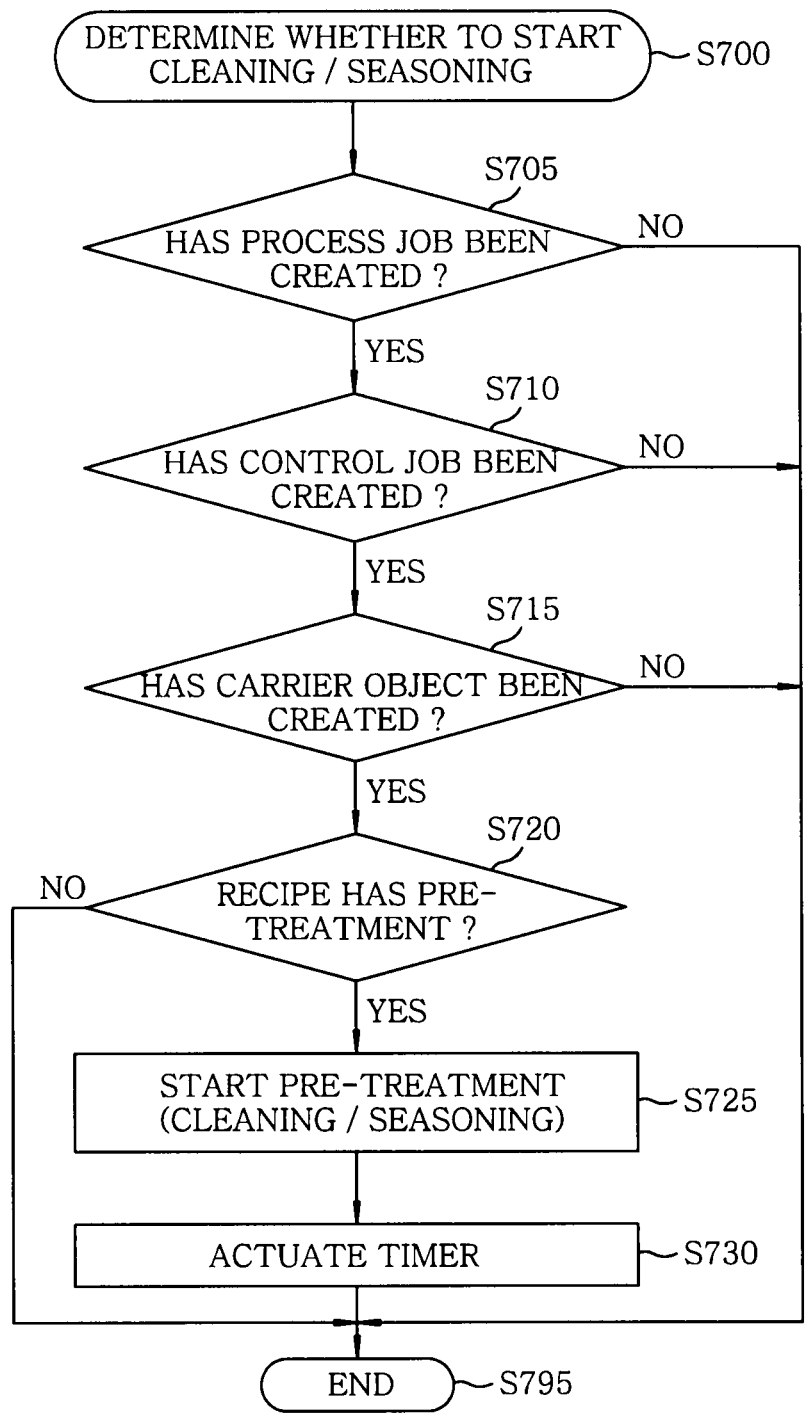
FIG. 7 is a flowchart of a routine showing how to determine whether to start cleaning or seasoning in accordance with the embodiment of the present invention.

The process of determining whether to allow the equipment controller EC to start the cleaning, seasoning or the like will be described by referring to the flowchart in FIG. 7. The process of determining whether to start the cleaning or seasoning in FIG. 7 is performed every preset period of time.

(Process of Determining Whether to Start Cleaning or Seasoning)

The process of determining whether to start the cleaning or seasoning starts in step S700. Then, the determination unit 255 determines whether a process job PJ has been created in step S705. The process job PJ has been created by the generation unit 260 when the instruction to create the process job PJ was received from the host computer 100.

If the process job PJ has been created, the determination unit 255 determines whether a control job CJ has been created in step S710. The control job CJ has been created by the generation unit 260 when the instruction to create the control job CJ was received from the host computer 100.

If the control job CJ has been created, the determination unit 255 determines whether a carrier object has been created in step S715. The carrier object has been created by the generation unit 260 when at least one of the commands of the instruction to "transfer the FOUP to a device" (NOTIFICATION), the instruction to "transfer the FOUP to a certain loading port LP of a device" (BIND), the notification that "ID of the FOUP is read" (CID READ) and the notification that "the FOUP is carried out" (OUT) is received.

If the carrier object has been created, the determination unit 255 determines whether there is the pre-treatment in the recipe corresponding to the recipe names displayed in the process job PJ in step S720. If there is the pre-treatment in the recipe, the process executing control unit 270 starts the pre-treatment such as cleaning, seasoning, or the like in step S725 and actuate the timer 275 in step S730. Then, the process goes to step S795 to be ended.

If any one of the process job PJ, the control job CJ, and the carrier object has not been created in the steps S705 to S715, the process goes to the step S795 to be ended.

The order of the steps S705 to S715 is not limited to that of FIG. 7, and the order is changeable. The process can perform the cleaning, the seasoning, or a combination thereof as the pre-treatment.

Figure 9:
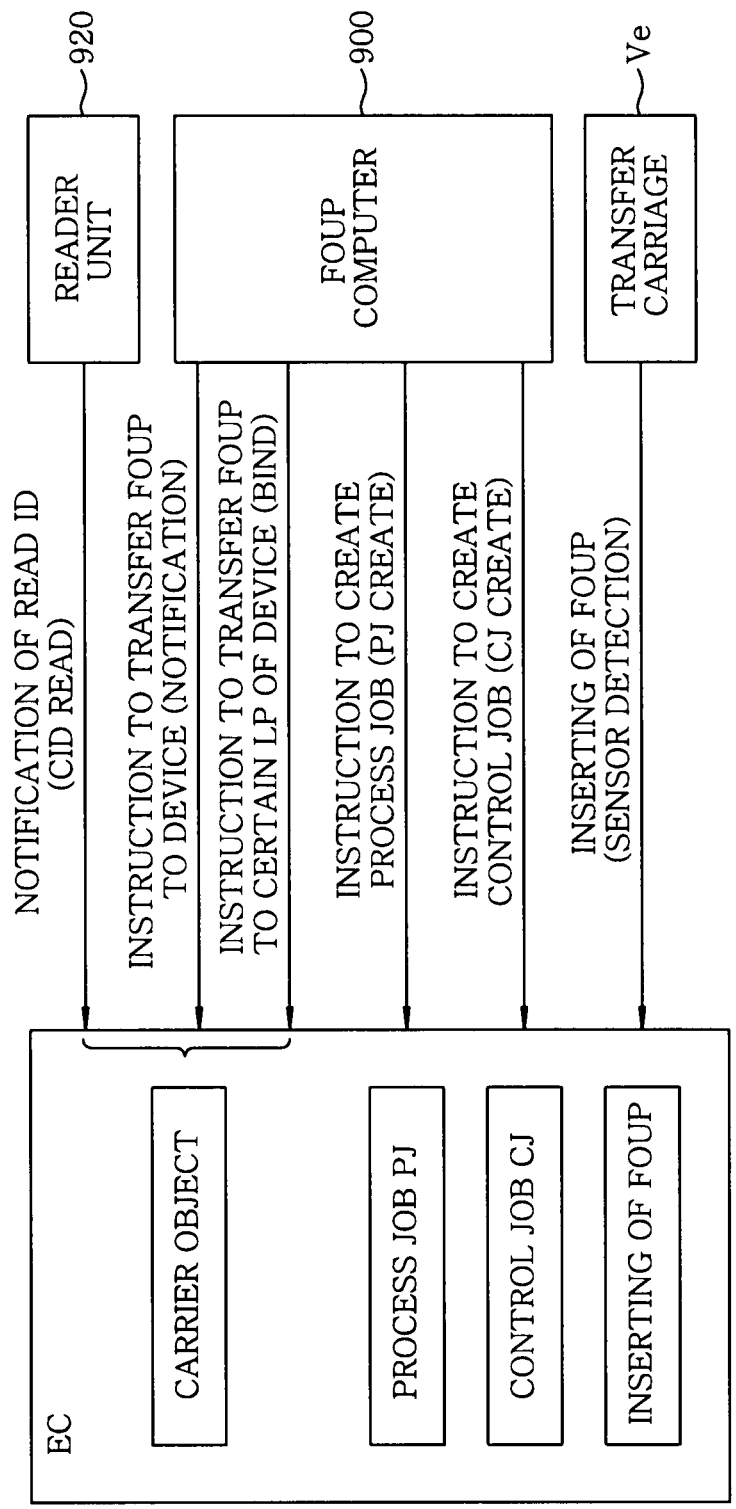
FIG. 9 shows how data flows between components in accordance with a comparison example.

The efficiency of the process of determining whether to start the cleaning or seasoning will be described by comparing the process with a comparison example. In the comparison example, as shown in FIG. 9, the equipment controller EC creates a process job PJ and a control job CJ according to an instruction to "create the process job PJ" (PJ CREATE) and an instruction to "create the control job CJ" (CJ CREATE), respectively, from a host computer 900. The equipment controller EC also creates a carrier object according to an instruction to "transfer a FOUP to a plasma processing device" (NOTIFICATION) or an instruction to "transfer a FOUP to a certain loading port LP of a plasma processing device" (BIND) from the host computer 900, or a notification that "ID of a FOUP is read" (CID READ) from a reader unit 920. Moreover, as shown in FIG. 10, when a FOUP 700a transferred by the transfer carriage Ve is inserted into a loading port LP and a sensor Sn senses the inserting of the FOUP 700a and notifies the sensed result to the equipment controller EC, the equipment controller EC generates a signal indicating the inserting of the FOUP 700a.

In accordance with the comparison example, if it is determined that all of the carrier object, the process job PJ, the control job CJ, and the signal indicating the inserting of the FOUP are generated, the cleaning or seasoning is started. Accordingly, the process is not started unless the FOUP reaches a loading port. In other words, when the cleaning or seasoning is performed, even though it is not necessary that a product wafer W be inserted into the loading port, the comparison example requires the product wafer to be inserted into the loading port before the cleaning or seasoning is performed. As a result, the product wafer W has been inserted into the loading port when the pre-treatment is started, and the product wafer W in the loading port will have been on standby until the pre-treatment is completed.

Figure 10:
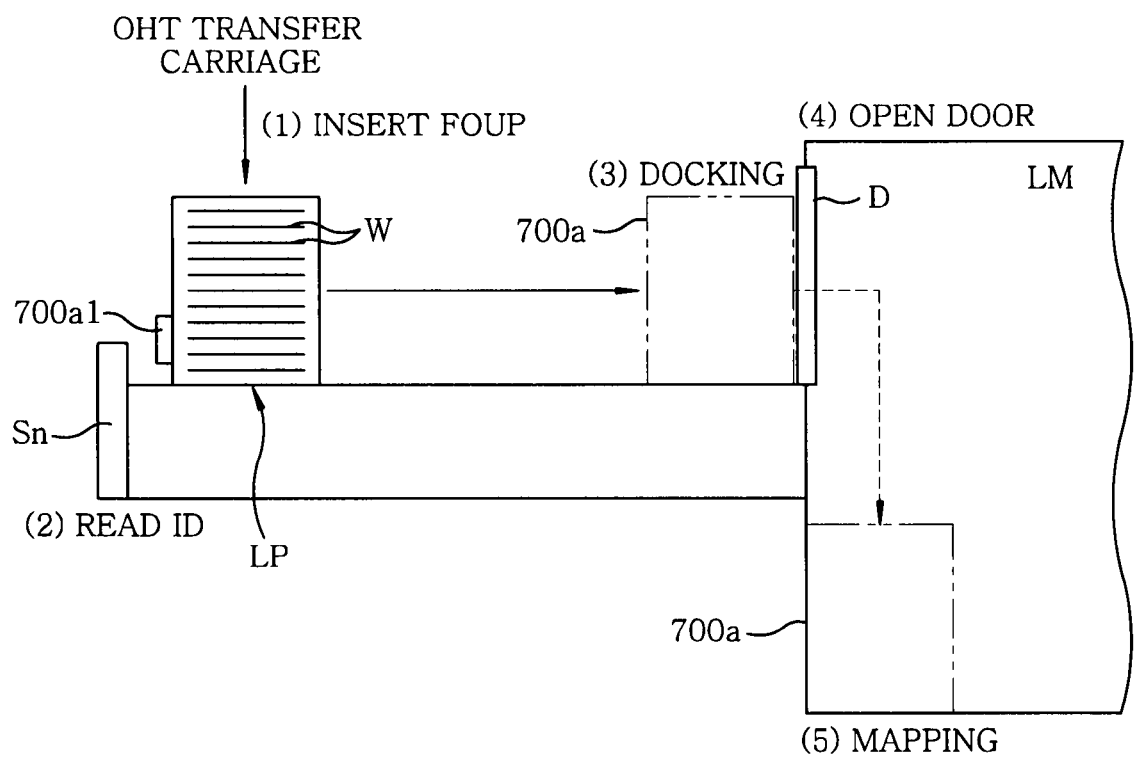
FIG. 10 shows how operations are executed from FOUP inserting to mapping.

Particularly, as shown in FIG. 10, the FOUP 700a is inserted into the loading port LP (1: FOUP inserting), and then a reader reads a tag 700a1 attached on the FOUP 700a (2: ID reading). Next, the FOUP 700a is docked with the load module LM (3: docking), and a door of the load module LM is opened (4: door opening). The FOUP 700a is inserted into the load module ML, and the cover of the FOUP 700a is open to check product wafers W in the FOUP 700a and read slot numbers of the product wafer W (5, mapping). The equipment controller EC generates a FOUP inserting signal after the above operations are completed. In this case, the throughput is more significantly decreased.

On the other hand, in accordance with the process of determining whether to start the cleaning or seasoning of the present embodiment, when the process job PJ has information related to the pre-treatment such as the cleaning, seasoning, or the like, if the process job PJ, the control job CJ, and the carrier object have been created, the cleaning or seasoning is started in spite of no FOUP inserting signal. That is, it is possible to perform the pre-treatment for the FOUP of a next processing lot without any notification that the FOUP reaches in the destination's plasma processing device. As a result, since it is possible to perform the transferring of the FOUP and the pre-treatment simultaneously, the throughput can be improved and the standby time of the FOUP in the loading port LP can be shortened, thereby increasing the productivity.

(Process of Start or Stop of Processing Product Wafer)

The process of starting or stopping processing a product wafer will be described by referring to the flowchart in FIG. 8. The process of starting or stopping processing a product wafer in FIG. 8 is performed every preset period of time.

Figure 8:
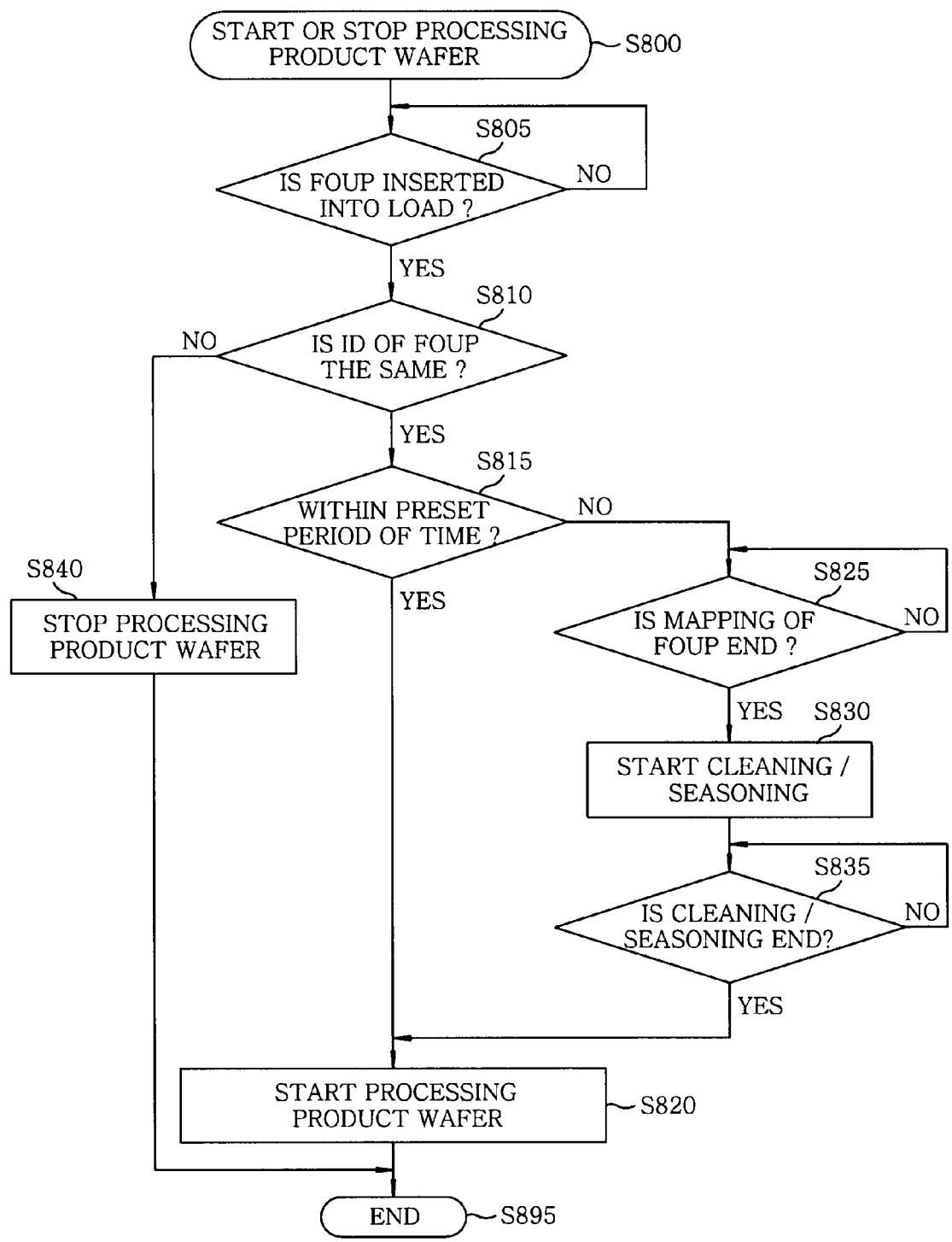
FIG. 8 is a flowchart of a routine showing how to start or stop processing a product wafer in accordance with the embodiment of the present invention.

The process of starting or stopping processing a product wafer is started in step S800 in FIG. 8. The process executing control unit 270 determines whether a FOUP is actually inserted into the loading port LP in step S805. The process executing control unit 270 makes the determination on the basis of FOUP information detected by the aforementioned sensor Sn. If the FOUP is inserted into the loading port LP, the process executing control unit 270 determines whether ID (i.e. identification information) of the FOUP that is read from ID reading information of the actually transferred FOUP is identical to the ID of the FOUP displayed in the process job PJ in step S810. If the read ID is identical to the displayed ID, the process executing control unit 270 determines by using the timer 275 whether a preset period of time has lapsed after the starting time of the pre-treatment in step S815. If the preset period of time has not lapsed the preset value, the process executing control unit 270 determines that the condition inside the processing space of the process module PM is adequate to process the product wafer and starts to process the product wafer (by instructing the machine controller MC) in step S820. Then, the process is ended in step S895).

In the meantime, if it is determined that the preset period of time has lapsed the preset value in the step S815, the process executing control unit 260 determines that the condition inside the processing space of the process module PM is not adequate to process the product wafer and then waits until the mapping is ended (refer to FIG. 10) in step S825. The process goes to step S830 to allow the process executing control unit 260 to re-start the cleaning or seasoning. Thereafter, the process executing control unit 260 waits until the cleaning or seasoning is completed in step S835. Then, the process goes to the step S820 to allow the process executing control unit 260 to start the plasma processing of the product wafer. Lastly, the process goes to the step S895 to be ended.

If the read ID is not identical to the displayed ID, the process goes to step S840 to allow the process executing control unit 270 to determine that the condition inside the processing space is not adequate to process the different product wafer reached and to stop the processing of the reached product wafer. Then, the process is ended in the step S895.

With the above process, it is determined whether the condition inside the processing space is adequate to perform the plasma processing of successive product wafers. Accordingly, it is possible to determine whether to perform the plasma processing of the product wafer of a FOUP when the FOUP arrives, whether to perform the plasma processing after another cleaning or the like is performed, or whether to stop performing the plasma processing of the reached product wafer. Thus, although the pre-treatment is started before the FOUP reaches the loading port LP, it is possible to control the balance of the processing efficiency and the production yield in consideration of the product wafers and the condition inside the processing space, thereby preventing the production yield from being decreased and increasing the productivity.

In each embodiment of the present invention, the operations of the components are related to each other, and it is possible to change the respective operations of the components into a series of operations in consideration of their relationships. Accordingly, the embodiments of the control device of the plasma processing system can be changed into those of the control method of the plasma processing system. Moreover, the embodiments of the control method of the plasma processing system can be considered as those of the storage medium storing the control program executable in a computer, which controls the plasma processing system.

While the invention has been shown and described with respect to the embodiments, it will be understood by those skilled in the art that various changes and modification may be made without departing from the scope of the invention as defined in the following claims.

Accordingly, in accordance with the present invention, there are provided a control device and a control method of a plasma processing system, which efficiently performs a pre-treatment, and a storage medium storing control program.

For example, the control device according to an embodiment of the present invention can be realized by using the equipment controller EC only, or by using the equipment controller EC and the machine controller MC. Here, one or more equipment controllers can be used.

The plasma processing device, which performs the plasma processing of a target object in a FOUP, can be a plasma etching device, a plasma CVD device, an ashing device, or a sputtering device. The target object includes a silicon wafer or a substrate.

What is claimed is:

1. A control device of a plasma processing system, which transfers a plurality of carriers to a plurality of plasma processing devices and performs plasma processing of substrates inserted in each carrier in the plasma processing devices, the control device comprising:
   a communication unit, configured to receive processing information related to a first carrier having substrates therein;
   a determination unit, configured to determine whether the processing information received by the communication unit includes pre-treatment information related to at least one of the plurality of plasma processing devices;
   a generation unit, configured to determine whether a desired condition of transferring of the first carrier is satisfied and to generate an object command in response to a determination that the desired condition is satisfied; and
   a process executing control unit, configured to start a pre-treatment process in the at least one of the plurality of plasma processing devices in preparation for substrates of the first carrier without any notification that the first carrier has reached a plasma processing destination if the determination unit has determined the processing information includes pre-treatment information and the generation unit has generated the object command, wherein the plasma processing destination is a location at which the first carrier is positioned for withdrawal of substrates therefrom for processing of said substrates in the at least one of the plurality of plasma processing devices.

2. The control device of claim 1, wherein the plasma processing destination is a loading port for the at least one of the plurality of plasma processing devices, and wherein the generation unit generates the object command before the first carrier reaches the loading port of the at least one of the plurality of plasma processing devices.

3. The control device of claim 1, wherein the communication unit receives information related to processing of at least one of said substrates in the first carrier and information related to transferring of the first carrier as the processing information related to the first carrier,
   the determination unit determines whether the information related to processing at least one of said substrates in the first carrier has the pre-treatment information related to at least one of the plurality of plasma processing devices, and
   the generation unit generates the object command for the first carrier according to the information related to transferring of the first carrier if it is determined that the information related to processing at least one of said substrates in the first carrier has the pre-treatment information by the determination unit.

4. The control device of claim 1, wherein, if the processing information related to the first carrier indicates has at least one of cleaning or seasoning, the determination unit determines that the pre-treatment information is included in the processing information.

5. The control device of claim 1, wherein the process executing control unit re-performs the pre-treatment process if the first carrier reaches the plasma processing destination at a time greater than a preset period of time after the pre-treatment process is started.

6. The control device of claim 1, wherein the process executing control unit stops processing of substrates of a second carrier if the second carrier reaches the plasma processing destination before the first carrier.

7. A control method of a plasma processing system, which transfers a plurality of carriers to a plurality of plasma processing devices and performs plasma processing of substrates inserted in each carrier in the plasma processing devices, the control method comprising:
   receiving processing information related to a first carrier having substrates therein;
   determining whether the received processing information related to the first carrier includes pre-treatment information related to at least one of the plurality of plasma processing devices;
   determining if a desired condition of transferring of the first carrier is satisfied and generating an object command in response to a determination that the desired condition of transferring of the first carrier is satisfied; and
   starting a pre-treatment process in the at least one of the plurality of plasma processing devices in preparation for substrates of the first carrier without any notification that the first carrier has reached a plasma processing destination if it is determined that the received processing information related to the first carrier includes pre-treatment information and the object command is generated, wherein the plasma processing destination is a location at which the first carrier is positioned for withdrawal of substrates therefrom for processing of said substrates in the at least one of the plurality of plasma processing devices.

8. A non-transitory computer readable storage medium storing a control program of a plasma processing system, which transfers a plurality of carriers to a plurality of plasma processing devices and performs plasma processing of substrates inserted in each carrier in the plurality of plasma processing devices, the program comprising:

a process of receiving processing information related to a first carrier having substrates therein;

a process of determining whether the received processing information relating to the first carrier includes pre-treatment information related to at least one of the plurality of plasma processing devices;

a process of determining whether a desired condition of transferring of the first carrier is satisfied and generating an object command in response to a determination that the desired condition of transferring of the first carrier is satisfied; and starting a pre-treatment process in the at least one of the plurality of plasma processing devices in preparation for substrates of the first carrier without any notification that the first carrier has reached a plasma processing destination if it is determined that the received processing information relating to the first carrier includes pre-treatment information and if the object command is generated, wherein the plasma processing destination is a location at which the first carrier is positioned for withdrawal of substrates therefrom for processing of said substrates in the at least one of the plurality of plasma processing devices.

9. The control device of claim 1, wherein the process executing control unit is configured to start the pre-treatment process before the first carrier arrives at the plasma processing destination.

10. The control device of claim 1, wherein the pre-treatment process is performed with a dummy substrate in the at least one of the plurality of plasma processing devices and the pre-treatment process prepares the at least one of the plurality of plasma processing devices for subsequent processing performed on substrates of said first carrier.

11. The control device of claim 10, wherein the process executing control unit is configured to start the pre-treatment process before the first carrier arrives at the plasma processing destination.

12. The control device of claim 1, wherein the processing information relating to the first carrier includes information relating to a recipe for at least one substrate in the first carrier.

13. The control device of claim 1, wherein the pre-treatment process is a process carried out in the at least one of the plurality of plasma treatment devices prior to processing performed on a substrate of said first carrier in the at least one of said plurality of plasma processing devices and in preparation for processing performed on said substrate of said first carrier in the at least one of said plurality of plasma processing devices, and wherein the pre-treatment process is performed when said substrate of said first carrier is not located in the at least one of the plurality of plasma processing devices.

14. The control device of claim 1, wherein the desired condition of transferring of the first carrier comprises information relating to at least one command associated with transferring of the first carrier.

15. The control device of claim 14, wherein the at least one command associated with transferring of the first carrier includes at least one of the following which indicates the desired condition of transferring of the first carrier is satisfied: (a) a command instructing transfer of the first carrier to a plasma processing device of the plurality of plasma processing devices, (b) a command instructing transfer of the first carrier to a loading port, (c) a notification that identification information identifying said first carrier has been read, or (d) a notification indicating a transfer of the first carrier has been carried out.

16. The control device of claim 15, wherein the pre-treatment process is a process carried out in the at least one of the plurality of plasma treatment devices prior to processing performed on a substrate of said first carrier in the at least one of said plurality of plasma processing devices and in preparation for processing performed on said substrate of said first carrier in the at least one of said plurality of plasma processing devices, and wherein the pre-treatment process is performed when said substrate of said first carrier is not located in the at least one of the plurality of plasma processing devices.

17. A control method according to claim 7, wherein the pre-treatment process is started before the first carrier arrives at the plasma processing destination.

18. A control method according to claim 7, wherein the pre-treatment process is performed with a dummy substrate in the at least one of the plurality of plasma processing devices and the pre-treatment process prepares the at least one of the plurality of a plasma processing devices for subsequent processing performed on substrates of said first carrier.

19. The control method according to claim 7, wherein the processing information relating to the first carrier includes information relating to a recipe for at least one substrate in the first carrier.

20. The control method according to claim 19, wherein the desired condition of transferring of the first carrier is determined to be satisfied in response to receiving of information relating to at least one command associated with transferring of the first carrier.

* * * * *